United States Patent [19]

Seiler

[11] Patent Number: 4,617,116
[45] Date of Patent: Oct. 14, 1986

[54] AUTOMOTIVE TYPE FUEL FEED SYSTEM

[75] Inventor: Wayne H. Seiler, Canton, Mich.

[73] Assignee: Ford Motor Company, Dearborn, Mich.

[21] Appl. No.: 843,925

[22] Filed: Mar. 24, 1986

Related U.S. Application Data

[63] Continuation of Ser. No. 607,029, May 4, 1984, abandoned.

[51] Int. Cl.$^4$ ............................................. F02M 47/02
[52] U.S. Cl. ................................... 210/137; 210/172; 210/416.4; 210/435; 123/514
[58] Field of Search ............... 210/172, 130, 133, 136, 210/137, 167, 176, 181, 194, 416.1, 416.4, 435; 123/445, 446, 457, 458, 510, 511, 514, 515; 137/255

[56] References Cited

U.S. PATENT DOCUMENTS

| | | | |
|---|---|---|---|
| 2,795,269 | 6/1957 | Witte | 137/255 |
| 3,363,763 | 1/1968 | Erickson | 210/137 |
| 3,695,438 | 10/1972 | Malpassi | 210/137 |
| 4,208,995 | 6/1980 | Simko et al. | 123/568 |
| 4,320,734 | 3/1982 | Balachandran | 123/514 |
| 4,478,197 | 10/1984 | Yasuhara et al. | 123/514 |
| 4,479,465 | 10/1984 | Flynn | 123/514 |
| 4,496,460 | 1/1985 | Haarstad et al. | 210/137 |
| 4,539,965 | 9/1985 | Soltau | 123/514 |

FOREIGN PATENT DOCUMENTS 683256  11/1952  United Kingdom ................ 210/137

Primary Examiner—Richard V. Fisher
Assistant Examiner—Wanda L. Millard
Attorney, Agent, or Firm—Robert E. McCollum; Clifford L. Sadler

[57] ABSTRACT

A fuel feed system for an automotive type internal combustion engine has a fuel reservoir from which fuel normally is supplied at a constant volume to the inlet side of a high pressure pump from a low pressure supply pump located in a fuel tank; the reservoir contains valving that automatically redirects fuel, which normally is returned from the high pressure pump directly to the fuel tank, back into the reservoir to maintain the constant supply of fuel to the inlet side of the high pressure pump even though the normal supply line is exposed to air and therefore not supplying fuel to the reservoir, thus preventing fuel starvation of the high pressure pump during the momentary exposure of its fuel supply line to air.

2 Claims, 4 Drawing Figures

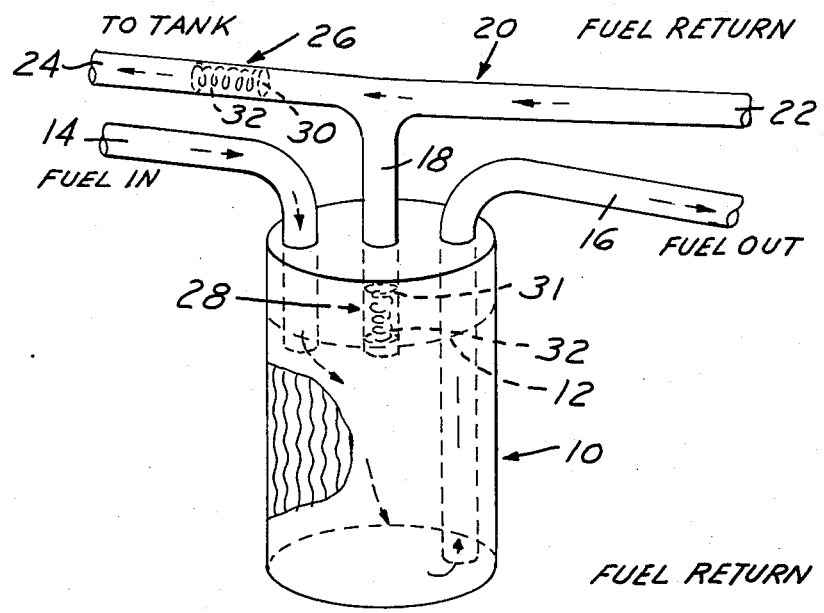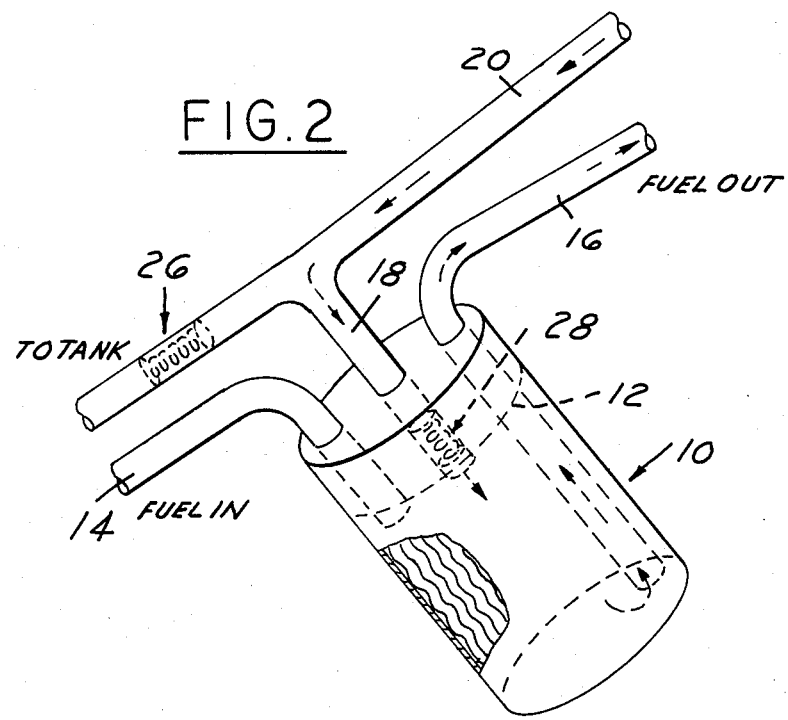

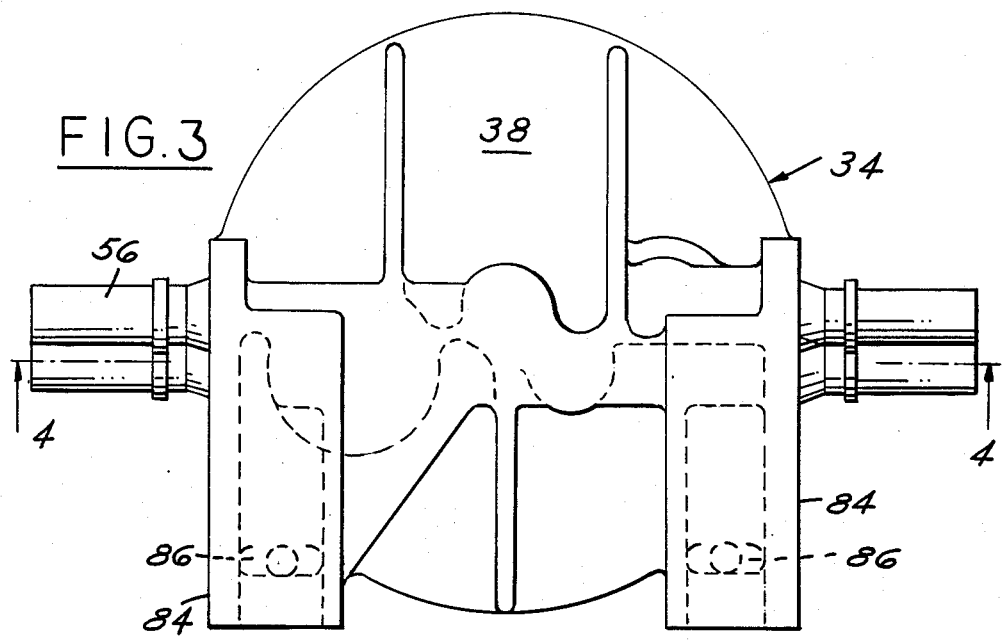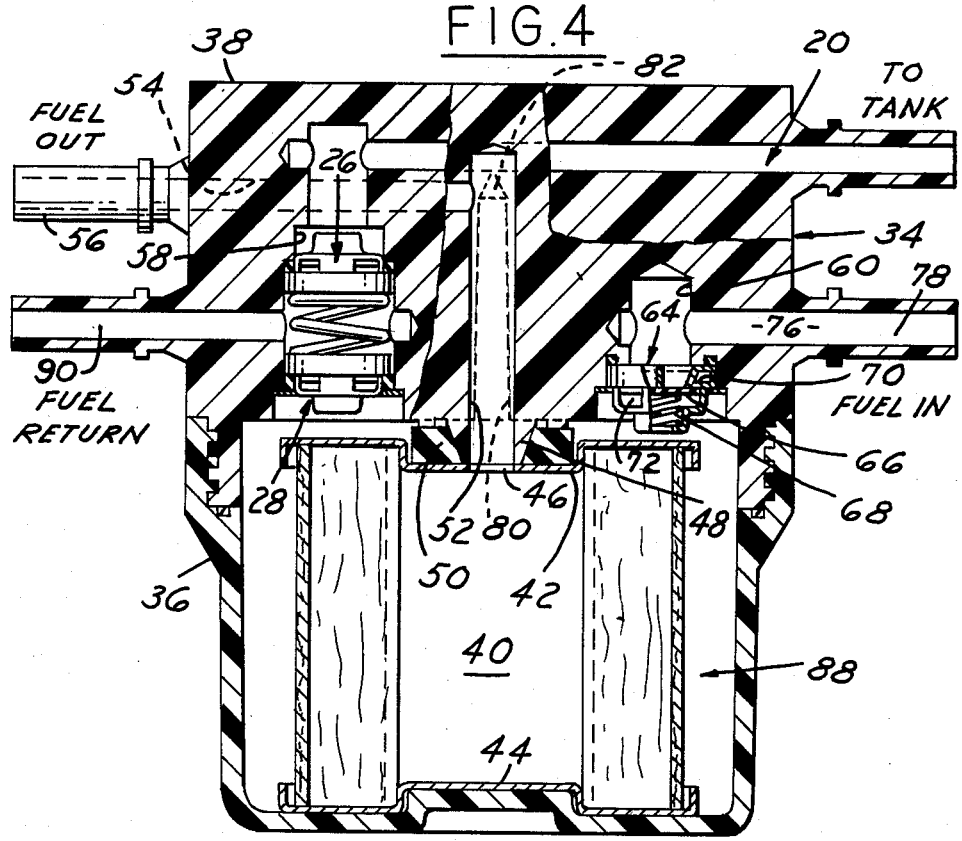

AUTOMOTIVE TYPE FUEL FEED SYSTEM

This application is a continuation of application Ser. No. 607,029, filed May 4, 1984, now abandoned.

This invention relates in general to an automotive type fuel feed system, and, more particularly, to a fuel injection system.

In an automotive carbureted type internal combustion engine, the conventional float bowl provides a sufficient reservoir of fuel to prevent starvation of the fuel supply upon momentary tilting of the vehicle to an angle that would expose the pickup tube in the fuel tank to air. In a fuel injection type system, however, there generally is no fuel reservoir or bowl, and exposure of the fuel inlet line to air upon sharp cornering of the vehicle, for example, could interrupt the fuel supply to the injectors.

This invention relates to a fuel injection type system that includes a fuel reservoir in the supply line from the fuel tank to the fuel injection pump that continues to be supplied with fuel to prevent an interruption of flow to the pump even through the normal supply line is exposed to air and no longer feeds fuel to the reservoir. More particularly, it relates to a fuel feed system in which the return flow of excess fuel from the fuel injector pump, which normally is connected directly to the fuel tank, is redirected into the reservoir in response to a pressure signal in the fuel inlet line.

It is a primary object of the invention, therefore, to provide a fuel feed system with a fuel reservoir having a main fuel supply line that normally supplies the reservoir continuously with fuel, a fuel return or bypass line that normally carries fuel not needed by the engine fuel pump back to the fuel tank, and valving that automatically redirects the return fuel flow into the reservoir in response to the nonsupply of fuel through the main inlet supply line, to maintain the reservoir full of fuel and prevent fuel starvation of the engine.

Fuel feed systems with fuel reservoirs are known. For example, Balachandran, U.S. Pat. No. 4,320,734, shows in FIGS. 2 and 3 a fuel supply system for a diesel engine having a fuel reservoir normally supplied with fuel from the line that returns excess fuel to the supply tank. The reservoir has a restricted connection to the outlet line so that when fuel from the supply tank is no longer available, a small amount of fuel can be syphoned from the reservoir. There is, however, no valving that normally directs the return fuel flow directly to the tank, bypassing the reservoir, and redirects the return fuel flow into the reservoir to maintain the reservoir full upon the nonsupply of fuel to the reservoir through the normal supply line. The reservoir in Balachandran merely serves as an accumulator for the fuel in the return line to supply a small amount of fuel to the engine when the supply line does not. The fuel flow return line is connected at all times to the reservoir.

Witte, U.S. Pat. No. 2,795,269, also shows a fuel feed system for an automotive type engine having a fuel reservoir that collects overflow of fuel from a carburetor and redirects the fuel into the carburetor if the fuel pump should fail. There are no provisions for continually supplying the reservoir with fuel either from the main supply line or from the fuel flow return line, which in this case is not connected into the reservoir other than as an overflow.

Other objects, features and advantages of the invention will become more apparent upon reference to the succeeding detailed description thereof, and to the drawings illustrating the preferred embodiments thereof; wherein, FIGS. 1 and 2 are schematic illustrations of a fuel feed system embodying the invention, and showing the system in different operating modes;

FIG. 3 is a plan view of a fuel reservoir embodying the invention; and

FIG. 4 is a cross-sectional view taken on a plane indicated by and viewed in the direction of the arrows 4—4 of FIG. 3.

FIGS. 1 and 2 illustrate schematically a fuel feed system incorporating a fuel reservoir 10 normally filled with fuel to a level indicated by dot/dash lines 12. The reservoir is supplied with fuel from a main fuel inlet line 14 that is adapted to be connected to the outlet of a low pressure fuel supply pump (not shown) located in a fuel tank. The pump normally would operate with an output pressure level of 3 to 5 psi, for example.

Reservoir 10 also has a fuel outlet line or tube 16 that is adapted to be connected to the inlet suction side of a higher pressure fuel pump (not shown). It would supply fuel at, say, a pressure level of 39 psi, to one or more fuel injectors, for example, for the supply of fuel to the internal combustion engine with which they are associated. The system as thus far described, except for the inclusion of reservoir 10, is similar to that shown and described in FIG. 4 of U.S. Pat. No. 4,208,995, assigned to the assignee of this invention.

Reservoir 10 further contains an auxiliary fuel inlet line 18 that is a branch of a fuel flow return line 20. The latter is adapted to be connected at one end 22 to the outlet of the conventional pressure regulator valve associated with the high pressure pump in series flow relationship with the injectors to carry away fuel from the pump that is in excess of that required to supply the injectors. In essentially all fuel injection systems, the high pressure injector pump always is supplied with a volume of fuel that is in excess of that required to assure a constant supply of fuel to the injectors.

The excess fuel from the high pressure pump normally is routed through return line 20 and a branch 24 directly to the fuel tank (not shown) adjacent the inlet side of the low pressure pump located in the tank, as previously described. As will become clearer later, a second branch 18 of return line 20 is used at times to divert the flow of this return fuel from the tank to reservoir 10 whenever fuel supply line 14 becomes exposed to air.

Fuel return line 20 contains in this case a pair of pressure relief type check valves 26 and 28 that allow fuel flow in a direction toward the tank and the reservoir but not in the opposite directions. Each valve is essentially the same known construction and consists of a disc type valve 30,31 seated by a low force spring 32, such as, for example, ½ psi level.

In operation, the high pressure injection pump would provide an inlet suction of, say, 2 psi, for example. Accordingly, when the system is operating normally, fuel will be supplied to inlet line 14 with a prssure head of 3 to 5 psi, for example, from the low pressure pump in the fuel tank, combined with the 2 psi suction head of the high pressure pump to effect seating of disc valve 31 in fuel return line branch 18. The high pressure pump will provide a return flow pressure head in return line 20 of, say, for example, 1 to 1½ psi. This will be enough to unseat the ½ psi force spring of disc valve 30 in return line branch 24, and so the fuel will be returned directly to the tank.

When, however, the vehicle should attain an attitude such as that shown in FIG. 2 causing fuel in the tank to be displaced to a location exposing fuel inlet line 14 to air, then atmospheric pressure will be present in line 14 instead of the 3 to 5 psi pressure head. This then permits the return fuel in line 20 and branch 18, which is at a pressure head of 1 to 2 psi, to overcome the spring force of disc valve 31 and open the line to reservoir 10. The fuel flow then flows directly from the high pressure pump through the pressure regulator valve and return line 20 to reservoir 10 to maintain the reservoir full of fuel and compensate for the lack of input from line 14. Accordingly, when inlet line 14 is exposed to air, the return fuel instead of being directed to the tank now flows into the reservoir to maintain a normal supply of fuel to high pressure pump inlet line 16.

FIGS. 3 and 4, which are essentially to scale, show a reservoir assembly 10 that illustrates a practical example of one to be used in the systems shown in FIGS. 1 and 2. More particularly, the assembly includes a plastic two-piece housing 34 consisting of a lower cup shaped fuel bowl portion or reservoir 36 that threadedly receives thereon an upper cover portion 38.

Lower portion 36 constitutes the fuel reservoir. It contains a pleated paper type filter 40 having upper and lower annular end plates 42 and 44, and a centrally located outlet 46.

Upper housing portion 38 is formed with a conical-like projection 48 for cooperation with an annular seal element 50 to force all inlet fuel flow around the periphery of filter 40 and therethrough to outlet 46. Housing portion 38 also contains the various inlet and outlet and return fuel passages. A vertical centrally located outlet passage 52 is intersected by a second passage 54 having a tube type fitting 56 for connection by a tube to the inlet of the engine high pressure fuel pump. Passages 52 and 54 thus are comparable to outlet line 16 shown in FIGS. 1 and 2.

Upper housing portion 38 is also provided with a number of stepped diameter recesses 58 and 60. Recess 58 is open at its bottom directly to the interior of reservoir 36 and is provided with the one-way check valve 28 (FIG. 1) to control flow between the two.

The upper portion of recess 58 is intersected by a passage corresponding to return passage 20 shown in FIGS. 1 and 2. It is connected directly to the fuel tank (not shown) to provide fuel for the inlet suction side of the low pressure pump in the tank. A second one-way check valve 26 controls the flow to the tank. Like check valve 28, check valve 26 consists of a disc seated by a spring with a force of ½ psi, for example, the check valve in this case facing in a direction opposite to that of check valve 28. A light pressure positioning spring is shown located between the two check valves.

Although check valve 26 is shown in this case in return line 20, alternatively, a reed type valve could be substituted therefor and located in return line 20 downstream near the entrance to the fuel tank. Such a reed valve would be the equivalent of valve 26 and operate in essentially the same manner, providing a 1 to 1½ psi restriction to return flow of the fuel.

The other recess 60 in upper housing portion 38 also connects directly to reservoir 36 past a one-way check valve 64, which is essentially of the same construction as check valves 28 and 26. The check valve consists of a disc 66 movable by a spring 68 onto an annular seat 70 to prevent communication between the two passages. When fuel pressure moves the disc valve against spring 68, fuel can flow around the disc and through holes 72 in the periphery of the valve housing. The force of the spring in this case, as mentioned previously, is chosen to be approximately ½ psi, or of low value. Recess 60 is connected by a passage 76 to an adapter nipple 78 that would be connected by suitable tubing to the outlet of the low pressure fuel pump in the fuel tank. Check valve 64 constitutes an anti-syphoning valve to prevent fuel flow back to the pump upon exposure of the pump inlet to air, while permitting fuel flow in the opposite direction into the reservoir. It also prevents flow of fuel from the tank to the reservoir when servicing the unit by unscrewing the lower body. Line 78 corresponds to inlet line 14 in FIGS. 1 and 2.

Completing the construction, a further air bleed passage 80 having a restricted end 82 is provided in upper housing portion 38 connecting the top of the fuel bowl portion with fuel return line 20 for bleeding air from the reservoir into the return line during certain operating conditions, as will be described. FIG. 3 also shows a pair of mounting projections 84 containing nuts 86 into which can be threaded mounting screws projecting from a portion of the vehicle body for supporting the reservoir assembly.

The operation of the FIGS. 3 and 4 embodiment is essentially the same as that already described in connection with FIGS. 1 and 2. In brief, in normal operation, the output from the low pressure pump in the fuel tank enters passage 76 under a pressure head of about 3 to 5 psi, opening check valve 64 and directing fuel to the outer periphery of filter 40 filling the chamber 88 with fuel. The fuel then flows through the filter and passes out outlet 46 and passages 52 and 54 to the inlet of the high pressure pump. The excess fuel from the pump flows through line 90 with a pressure head of 1 to 1½ psi, unseating check valve 26, and past the valve into return line 20. The inlet pressure head of 3 to 5 psi in line 76 causes check valve 28 to remain seated and prevent the communication of return flow of fuel in line 20 from entering the reservoir. A normal flow of fuel thus is supplied from the inlet 76 through the reservoir chamber 88 and filter 40 and outlet 46 to the inlet of the high pressure pump, the excess flow of fuel from the pump flowing through return line 20 directly to the tank.

In the event that the vehicle attains an attitude where supply line 76 is exposed to air, the sudden pressure drop from 3 to 5 psi pressure head to an atmospheric level first causes a seating of anti-syphoning valve 64. Since the fuel being returned to the tank in return line portion 90 is at a pressure level of 1 to 2 psi, and there is a suction of approximately 2 psi in the high pressure pump inlet line portion 56, check valve 28 will be opened by the pressure differential to admit fuel from return line portion 90 directly into the reservoir and out therefrom through inlet line 52 to the high pressure pump. The opening of check valve 28 will now cause check valve 26 to close or seat. The reservoir now is supplied fuel from return line 90 rather than inlet passage 76.

As the tank supply fuel flow is less than the engine demand flow through inlet 56, the supply of fuel in the reservoir will slowly diminish. Filter 40 now acts like a wick drawing fuel down from the top of the outside of the filter while the column of fuel in the center of the filter remains as a solid core continuously supplying the high pressure pump with fuel. The surface tension of the fuel on the filter keeps it sealed and thereby prevents the center column of fuel from collapsing until the fuel level reaches near the bottom of the reservoir, at which time the column of fuel in the center will fall away and allow air to be drawn in. The reservoir would be designed to be large enough to prevent such an action for several minutes upon exposure of inlet line 76 to air. The high pressure pump inlet line 56 is not aware of the source of its fuel since it is still receiving the same volume of fuel as when supply line 76 was not exposed to air.

It will be seen, therefore, that the invention provides a fuel feed system that normally supplies fuel at a constant volume to the inlet of a pump through a main supply line from a fuel tank, and one that contains valving that automatically redirects or diverts excess return fuel flow, which normally would be returned to the tank, to the reservoir when the normal inlet line is exposed to air, thereby preventing fuel starvation of the fuel injection system.

While the invention has been shown and described in its preferred embodiments, it will be clear to those skilled in the arts to which it pertains that many changes and modifications may be made thereto without departing from the scope of the invention.

I claim:

1. A fuel feed system for the fuel pump of an internal combustion engine including a fuel tank, a fuel reservoir having a fuel inlet line from the tank normally containing fuel at above atmospheric pressure level, a fuel outlet from the reservoir connected to the inlet suction side of the pump for supplying fuel thereto, a fuel flow return line normally containing fuel at a pressure level lower than that of the fuel in the reservoir inlet line having one end connected to the outlet side of the pump for evacuating excess fuel from the pump and having first and second branches at its opposite end connected in parallel flow relationship respectively to the reservoir and to the tank, and a plurality of fuel pressure relief type valve means in the return line branches to automatically control fuel flow therethrough including a first relief valve in the first return line branch connected to the reservoir operable to block communication of the fuel in the return line to the reservoir in response to a higher pressure of the fuel in the reservoir acting thereagainst on one side of the valve than the lower pressure of the return fuel on the other side of the valve, the valve opening upon a reversal of the pressure differential in response to air being present in the reservoir inlet line, and a second relief valve in the second return line branch connected to the tank openable upon a pressure level upstream of the latter valve greater than the pressure level in the tank to pass return line fuel directly to the tank, the second relief valve being closable upon the first relief valve opening in response to a drop in pressure in the reservoir inlet line to an atmospheric level, whereby operation of the pump with fuel under pressure in the reservoir inlet line maintains the reservoir supplied with a constant flow of fuel from the latter inlet line for flow through the outlet to the pump and directs the return flow therefrom through the return line directly to the tank bypassing the reservoir, while operation of the pump when the reservoir inlet line decays to a pressure level lower than the pressure level in the first return line branch causes a diversion of the return flow of fuel in the pump return line to the reservoir and therefrom through the outlet to the inlet of the pump concurrent with the blocking of the flow of return flow to the tank through the second branch thereby providing an uninterrupted supply of fuel at the same volume level to the pump during momentary exposure of the reservoir line to air as when the latter inlet line is at a pressure level higher than the pressure in the first return line branch.

2. A system as in claim 1, including a filter element in the reservoir connected exteriorly to the fuel in the inlet line and interiorly to the outlet thereby effecting a flow of fuel from the bottom up inside of the filter.

* * * * *